United States Patent
Lee

[19]

[11] Patent Number: 6,155,665

[45] Date of Patent: Dec. 5, 2000

[54] POSITION COMPENSATING TECHNIQUE USED DURING TWO-WAY PRINTING AND SCANNING

[75] Inventor: Myoung-Sool Lee, Kyungki-do, Rep. of Korea

[73] Assignee: SamSung Electronics Co., Ltd., Suwon, Rep. of Korea

[21] Appl. No.: 09/089,663

[22] Filed: Jun. 3, 1998

[30] Foreign Application Priority Data

Jun. 3, 1997 [KR] Rep. of Korea ............... 97-22804

[51] Int. Cl.[7] ................................................. G01D 15/16
[52] U.S. Cl. .......................................................... 347/19
[58] Field of Search ................. 347/19, 40, 107; 371/1; 714/700; 400/74, 279, 282, 323

[56] References Cited

U.S. PATENT DOCUMENTS 5,250,956  10/1993  Haselby et al. ........................ 347/19
5,530,460   6/1996  Wehl ....................................... 347/19
5,798,773   8/1998  Hiramatsu et al. .................... 347/19
5,835,108  11/1998  Beauchamp et al. .

FOREIGN PATENT DOCUMENTS 62-032072  2/1987  Japan .

Primary Examiner—Robert Beatty
Attorney, Agent, or Firm—Robert E. Bushnell, Esq.

[57] ABSTRACT

An error-compensating technique for scanned data, using a scanner having both a printing device which performs a bi-directional printing operation and a scanner device which moves in the same direction as that of the printing device and performs a scanning function, includes: a special pattern-printing process in which the printing device moves in a preset fixed direction and prints a special pattern-printing process; a pattern-recognizing process in which the scanning device moves in the same direction as that of the printing direction and recognizes the pattern; a pattern-recognizing process in which the scanning device moves in the opposite direction to that of the printing direction and recognizes the pattern; and a position compensation data-yielding process in which position compensation data for the bi-directional scanning data is yielded.

20 Claims, 3 Drawing Sheets

POSITION COMPENSATING TECHNIQUE USED DURING TWO-WAY PRINTING AND SCANNING

CLAIM OF PRIORITY

This application makes reference to, incorporates the same herein, and claims all benefits accruing under 35 U.S.C. §119 from my application entitled POSITION COMPENSATING METHOD DURING TWO-WAY PRINTING AND SCANNING, filed in the Korean Industrial Property Office on Jun. 3, 1997 and there duly assigned Serial No. P97-22804 by that Office.

BACKGROUND OF THE INVENTION

1. Field of the Invention

The present invention relates to a position compensating technique used during two-way printing and scanning. More particularly, it relates to a position compensating technique for a multi-tasking system having an ink-jet print head and a shuttle scanner, which measures a sliding deviation and compensates a position and sliding deviation according to an output result.

2. Discussion of Related Art

Multimedia systems, combinations of moving and still pictures, sound, music and words, especially in computers or entertainment systems are pervasive in the industrialized world. In line with the development of a multimedia computer system, a printer, a kind of peripheral equipment, comes to have various functions.

The multi-tasking system having printing and scanning functions is described below. The multi-tasking system having the printing and scanning functions receives/outputs data or a control signal from/to an external system through an interface. Data to be printed is transmitted from a personal computer to a central processing unit (CPU) through the interface. The CPU that receives the data to be printed reads out a necessary control program and data through a memory, and produces a control signal which is output to a print driver. The print driver controls the printing mechanism in response to an applied control signal, thus performing printing.

A shuttle scanner is used to scan the document on which the information is recorded. When the information of the document is scanned through the shuttle scanner, an image processor compensates the scanned image data and stores it in an image memory. The image data, stored in the image memory, is transmitted to the personal computer (PC) through the interface under the control of the CPU. The PC, receiving the image data via the interface, processes the image data and stores it as a database. In order to print the scanned data, data to be printed is produced again in a multi-tasking system. The multi-tasking system generates a control signal to the CPU, and image data is printed out on print media through the print driver and a print mechanism.

The multi-tasking system prints a certain print pattern in order to measure a print compensating value during two-way printing so that a user can examine the printing state with the naked eye. The multi-tasking system employs different methods of measuring a print compensating value by sets and the print compensating value varies with time.

In a multi-tasking system employing an ink-jet print head, a print compensating value varies with the amount of ink used, and a user has to change a print compensating value frequently. A print compensating value should be changed for each set of the multi-tasking system in the manufacturing process.

SUMMARY OF THE INVENTION

This invention is intended to print patterns, scan the printed patterns bi-directionally, yield an error-compensating value, and perform the compensation of scanned data. In order to achieve this purpose, the error-compensating technique for scanned data, wherein there is used a scanner apparatus having both a printing device which performs a bi-directional printing operation and a scanner device which moves in the same direction as that of the printing device and performs a scanning function, comprises: a special pattern-printing process in which the printing device moves in a preset fixed direction and prints a special pattern-printing process; a pattern-recognizing process in which the scanning device moves in the same direction as that of the printing direction and recognizes the pattern; a pattern-recognizing process in which the scanning device moves in the opposite direction to that of the printing direction and recognizes the pattern; and a position compensation data-yielding process in which the position compensation data for the bi-directional scanning data is yielded.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
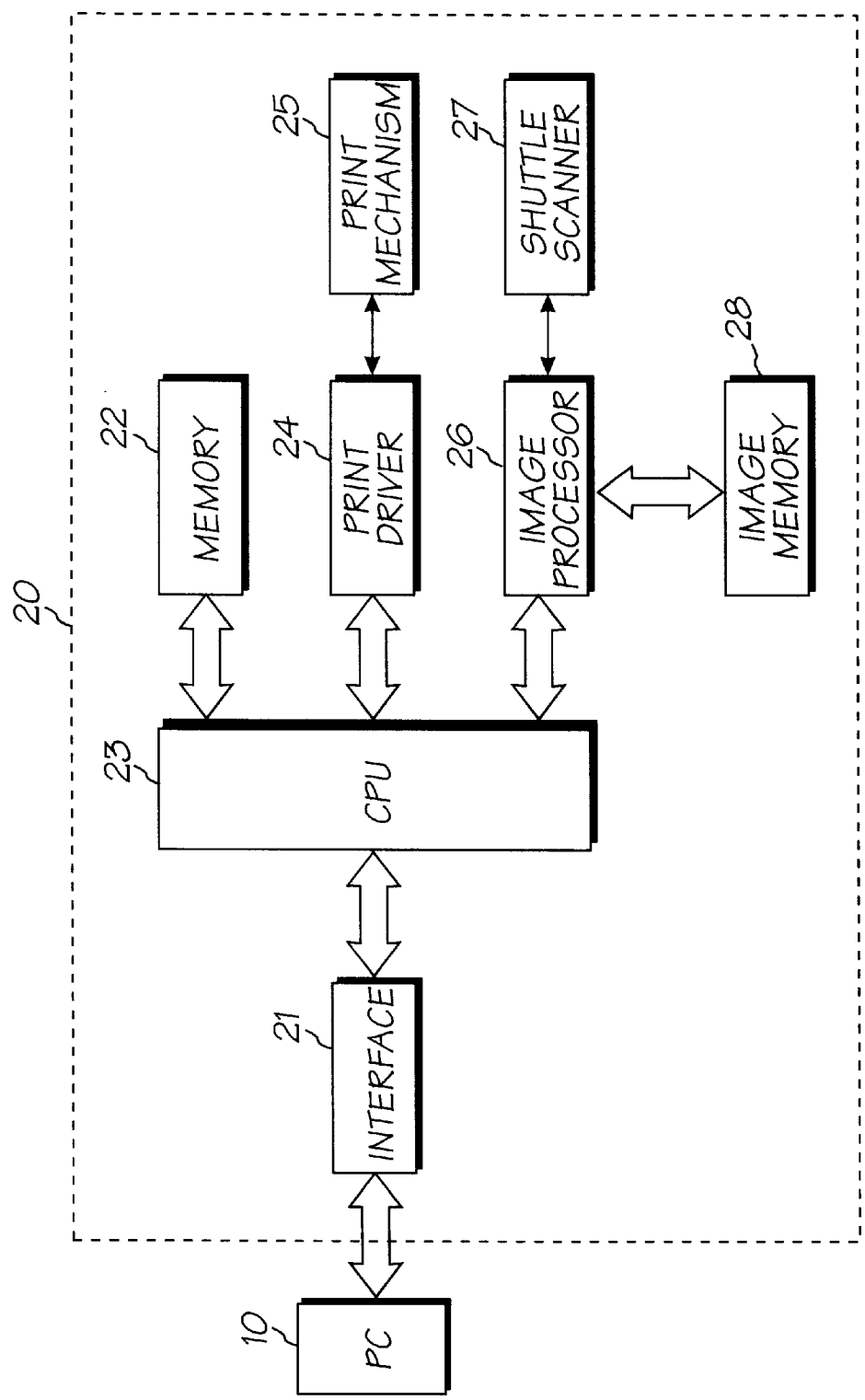
FIG. 1 is a block diagram of an internal circuit for an ink-jet printer with a shuttle scanner.

FIG. 1 is a block diagram of an internal circuit for an ink jet printer with a shuttle scanner as discussed above in the Discussion of Related Art. The multi-tasking system 20 receives/outputs data or a control signal from/to an external system such as a PC 10 through an interface 21. Data to be printed is transmitted from the PC 10 to a central processing unit CPU 23 through the interface 21. The CPU 23 reads out a necessary control program and data through a memory 22 and produces a control signal which outputs to a print driver 24.

A shuttle scanner 27 is used to scan the document on which the information is recorded and an image processor 26 compensates the scanned image data and stores it in an image memory 28. The image data, stored in the image memory 28, is transmitted to the PC 10 through the interface 21 under the control of the CPU 23. The multi-tasking system 20 provides a control signal to the CPU 23 and image data is printed out on print media through the print driver 24 and a print mechanism 25.

Figure 2:
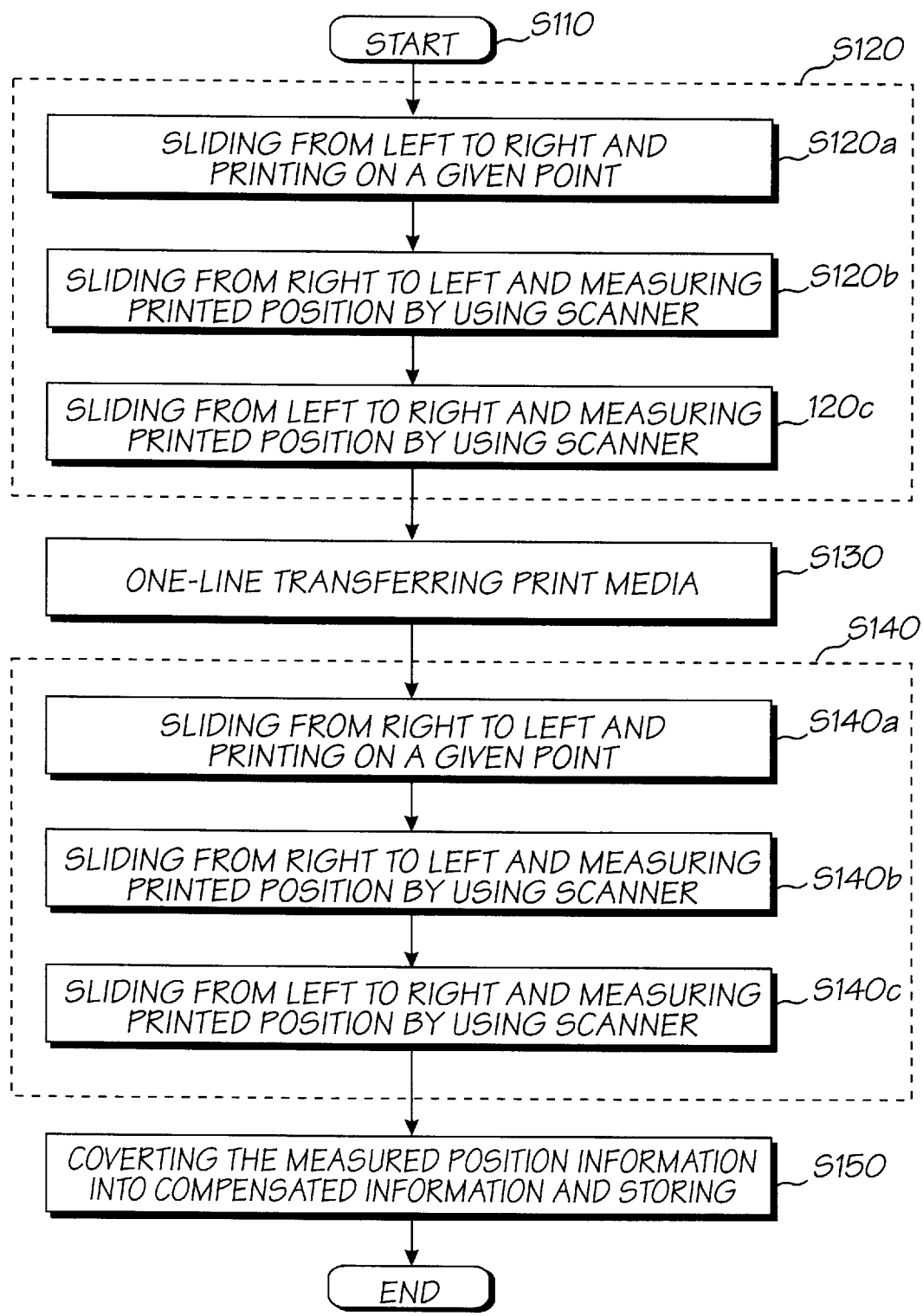
FIG. 2 is a control sequence of a position compensating technique during two-way printing and scanning in accordance with the present invention.
Figure 3:
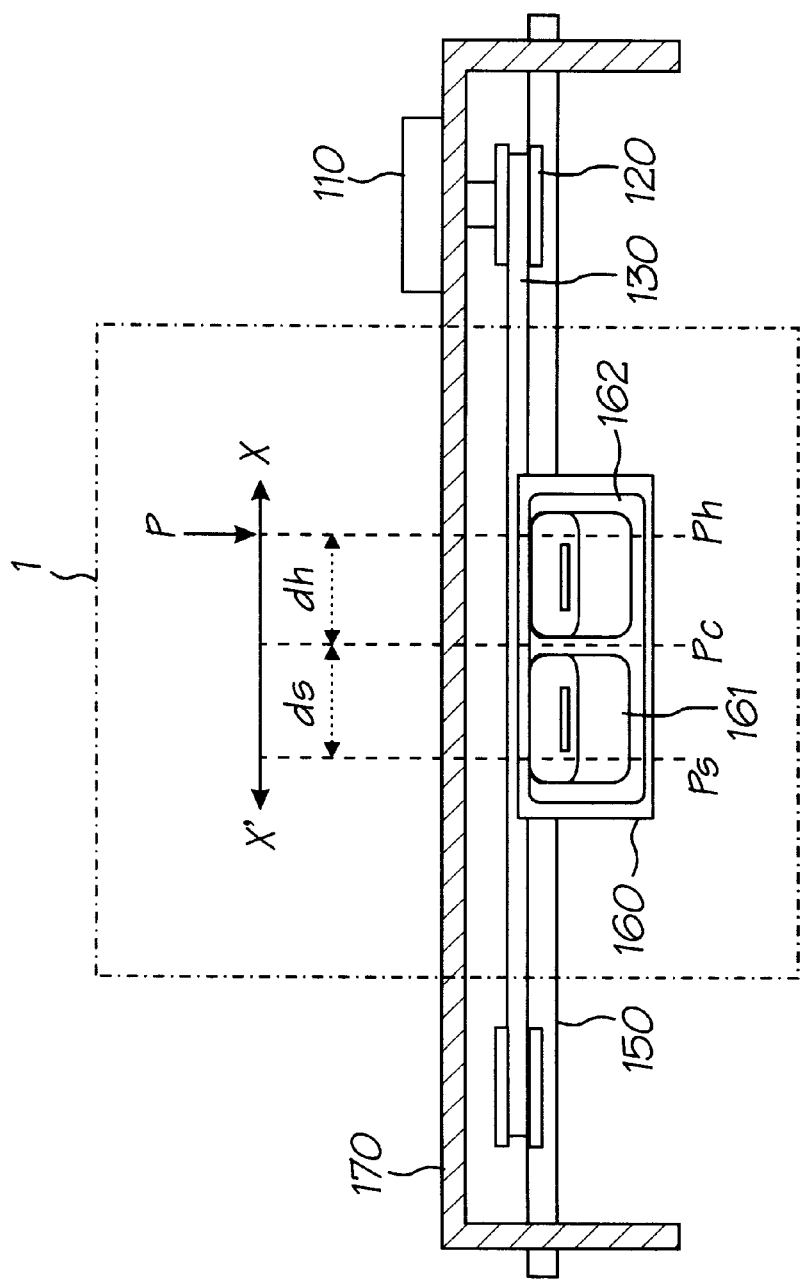
FIG. 3 depicts an ink-jet printer mechanism having a shuttle scanner in accordance with the present invention.

FIG. 2 is a control sequence of a position compensating technique in accordance with the present invention, and FIG. 3 depicts an ink-jet printer mechanism having a shuttle scanner in accordance with the present invention.

As shown in the drawings, the position compensating technique includes an initializing step S110 for compensating a print position; a first step S120 of sliding an ink-jet print head from left X' to right X once it is ready to compensate a print position in S110, printing a given point P, scanning in two directions, and then measuring a printed position; a second step S130 of one-line transferring a print media 1 for printing in an opposite direction once the first step S120 is completed; a third step S140 of measuring a print position, sliding ink-jet print head 161 from right X to left X' if the second step S130 is completed, scanning a given point in both directions, and then measuring the printed position and converting printed position information into print position compensation information and storing it. The details of the printing and scanning are more fully described as follows.

Once data to be printed is transmitted to the multi-tasking system from a personal computer, a control signal according to the print operation is generated in order to process the data to be printed as follows.

In the first place, a CR motor 110 which controls the rotation according to a control signal, transmits the rotating force to a belt 130 through a pulley 120. The ink-jet print head 161 is slid along the width of the print media by the force transmitted to the belt 130. The ink-jet print head 161 is moved under the guidance of a guide shaft 150. The ink-jet print head 161 sprays ink onto the print media 1 in response to the control signal.

Once a user places the document on the multi-tasking system for scanning, the document is scanned by the shuttle scanner 162. The shuttle scanner 162 which scans the information recorded on the document is mounted on one side of the ink-jet print head 161, and moves with ink-jet print head 161 along the guide shaft 150 by the rotating force of the CR motor 110. The scanned image data is stored by the PC 10 as a database, or processed in the PC 10 according to an application program.

There is a difference between an actual print position during printing and a print position computed in the application software because of the printer mechanism's inertia or backlash and the time it takes for the ink or dot wire from the ink-jet print head to reach the print media 1.

The difference doubles during two-way printing or two-way scanning, and a compensation value used to assure the best possible print quality and the scanning quality is calculated by software.

For such a compensation, the ink-jet print head of step S120 is slid from left X' to right X, and performs step S120a for the print operation on a given point P of the print media 1.

Once printing is performed in a constant pattern on the given point P of the print media 1, the scanner 162 is slid from right X to left X' to scan the printed position on the print media 1 (S120b). A value of the scanned point equals "$Y_{rl}$". If "$Y_{rl}$" is computed, the scanner 162 is slid from left X' to right X, through scanning and performs step (S120c) that measures the printed position.

If "$Y_{rl}$" is computed after changing the printing direction, the print media 1 is transferred one-line (S130) for printing in the opposite direction. If one line of print media 1 is transferred (S130), the third step S140 and step S140a are performed so that ink-jet print head 161 is slid from right X to left X', thereby printing on the print media 1 that has been one-line transferred.

Once printing on one-line transferred print media 1, the scanner 162 is slid from right X to left X', to measure the printed position (S140b) through scanning. The value of the printed position is "$Y_{lr}$". Once the value of the printed position "$Y_{lr}$" is computed, the scanner 162 is slid from left X' to right X to perform step S140c, thus measuring the printed position by scanning in the opposite direction. This scanning position is "$Y_{ll}$". When each value of the printed positions $Y_{rl}$, $Y_{rr}$, $Y_{lr}$ and $Y_{ll}$ is produced through the above steps, it is converted into print position compensating information (S150), thus processing the print position compensating information.

The following reference letters denote the following reference elements:

Em—Error made by print mechanism
Eh—Error by inkjet print head
Es—Error by photo-accumulating time
Em+Eh—Position error between print position in software and actual printed position
Em+Es—Error between actual printed position and position of scanned data Once setting such an error value, the position error equals 2*(Em+Eh) during two-way printing, and the position error equals 2*(Em+Es) during two-way scanning. Accordingly, the two-way print position compensation is expressed as follows:

$$|Y_{rr}-Y_{rl}|/2 \text{ or } |Y_{rr}-Y_{ll}|/2=Em+Es \qquad 1$$

$$Y_r=(Y_{rr}+Y_{rl})/2 \qquad 2$$

$$Y_l=(Y_{lr}+Y_{ll})/2 \qquad 3$$

$$|Y_r-Y_l|/2=Em+Eh \qquad 4$$

The information of two-way printing position compensation is output according to equations 1 to 4. A difference between the middle position of the two-way print position on the print media 1 and the position computed by software corresponds to a distance between ink-jet print head 161 and scanner 162, so $$|(Y_r-Y_l)/2-X|=dh+ds \qquad 5$$

the information of scanner's position error compensation is output through equation 5.

At this point, "dh" is a distance Ph between carrier 160's position Pc and ink-jet print head 161 mounted on carrier 160, and "ds" is a distance Ps between the position Pc of the carrier 160 of the multi-tasking system and that of the scanner 162. Once two-way printing and scanning position compensation information are computed through this step, outputting of the position information is completed through step S160. Once the position compensation information is output, it is stored in the memory of the multi-tasking system. Thus, as two-way printing operation and scanning operation are completed, the measured data is converted into position compensation information to be utilized during the two-way printing operation and scanning operation.

As described above, the present invention automatically measures and compensates the position error whenever the printing function of the multi-tasking system is used, so that the user may use the printing function more conveniently, and the number of the manufacturing steps for controlling the print position is decreased, thus enhancing the manufacturing efficiency.

It will be apparent to those skilled in the art that various modifications and variations can be made in the inventive print position compensating technique during two-way printing and scanning without departing from the spirit or scope of the invention. Thus, it is intended that the present invention cover the modifications and variations of this invention provided they come within the scope of the appended claims and their equivalents.

What is claimed is:

1. An error-compensating method for scanned data, comprising:
   a pattern-printing process with a moving ink-jet print head;
   a bi-directional printed pattern-scanning process; and
   a data-yielding process for compensating for an error by detecting a position error of bi-directional scanning results;
   wherein said pattern-printing process comprises sliding the ink-jet print head in a first direction and printing at a given point sliding a scanner in a second direction opposite to said first direction to measure said given point of printing and sliding said scanner in said first direction to further measure said given point of printing.

2. An error-compensating method for scanned data, using a scanner having both a printing device which performs a bi-directional printing operation and a scanner device which moves in a same direction as that of the printing device and performs a scanning function, said method comprising:
   a special pattern-printing process in which the printing device moves in a preset fixed direction and prints a special pattern;
   a pattern-recognizing process in which the scanning device moves in a same direction as that of a printing direction and recognizes the pattern;
   one-line transferring a print media;
   a pattern-recognizing process in which the scanning device moves in an opposite direction to that of the printing direction and recognizes the pattern; and
   a position compensation data-yielding process in which position compensation data for bi-directional scanning data is yielded.

3. The error-compensating method for scanned data as defined in claim 2, wherein the printing device prints patterns bi-directionally.

4. The error-compensating method for scanned data as defined in claim 3, wherein the printing device performs a printing function in one direction, then performs a line-feeding function, and then prints patterns in an opposite direction to that of the one direction.

5. The error-compensating method for scanned data as defined in claim 2, wherein the printing device prints patterns comprising vertical lines.

6. The error-compensating method for scanned data as defined in claim 2, wherein travel directions of the printing device and the scanning device are at a right angle with that of paper.

7. A position compensating method which takes place during two-way printing and scanning, comprising:
   a first step of sliding an ink-jet print head from left to right, printing at a given position, performing a two-way scanning, and measuring a printed position;
   a second step of one-line transferring a print media when the first step is completed;
   a third step of measuring a printed position by scanning the printed position in two directions by sliding the ink-jet print head from right to left when the second step is completed; and
   a fourth step of converting printed position information into print position compensation information and storing it.

8. A position compensating method as defined in claim 7, wherein the first step includes sub-steps of:
   printing on a given point by sliding the ink-jet print head from left to right;
   sliding a scanner from right to left to scan the printed position to measure the printed position; and
   remeasuring the printed position by sliding the scanner from left to right.

9. A position compensating method as defined in claim 7, wherein the third step includes sub-steps of:
   when one-line transferring the print media, sliding the ink-jet print head from right to left to perform the printing operation at a given point;
   sliding the scanner from right to left to scan a print point, thus measuring the printed position; and
   sliding the scanner from right to left to remeasure the printed position.

10. An error-compensating apparatus for scanned data, comprising:
    means for printing a pattern with a moving ink jet print head;
    means for bi-directional scanning of the printed pattern; and
    means for compensating for an error by detecting a position error based on bi-directional scanning results of the means for bi-directional scanning;
    wherein said printing means slides the ink-jet print head in a first direction and prints at a given point; and
    wherein said bi-directional scanning means scans in a second direction opposite to said first direction to measure said given point of printing and then scans in said first direction to further measure said given point of printing.

11. An error-compensating apparatus for scanned data, comprising:
    a scanner having both a printing device for performing a bi-directional printing operation and a scanner device for moving in a same direction as that of the printing device and for performing a scanning function;
    means for special pattern printing by moving the printing device in a present fixed direction and printing a special pattern;
    means for pattern recognizing by moving the scanning device in a same direction as that of a printing direction and recognizing the pattern;
    means for one-line transferring a print media after said pattern recognizing means recognizes the pattern;
    another means for pattern recognizing by moving the scanning device in an opposite direction to that of the printing direction and recognizing the pattern; and
    position compensation data-yielding means for yielding position compensation data for bi-directional scanning data.

12. The error-compensating apparatus for scanned data as defined in claim 11, wherein the means for special pattern printing causes the printing device to print patterns bi-directionally.

13. The error-compensating apparatus for scanned data as defined in claim 12, wherein the means for special pattern printing causes the printing device to perform a printing function in one direction, then to perform a line-feeding function, and then to print patterns in an opposite direction to that of the one direction.

14. The error-compensating apparatus for scanned data as defined in claim 11, wherein the means for special pattern printing causes the printing device to print patterns comprising vertical lines.

15. The error-compensating apparatus for scanned data as defined in claim 11, wherein travel directions of the printing device and the scanning device are at a right angle with that of paper.

16. A position compensating apparatus operating during two-way printing and scanning, comprising:

first means for sliding an ink-jet print head from left to right, printing at a given position, performing a two-way scanning, and measuring a printed position;

second means for one-line transferring a print media;

third means for measuring a printed position by scanning the printed position in two directions by sliding the inkjet print head from right to left; and fourth means for converting printed position information into print position compensation information and storing it.

17. A position compensating apparatus as defined in claim 16, the first means including:

a device for printing on a given point by sliding the ink-jet print head from left to right;

a device for sliding a scanner from right to left to scan the printed position and to measure the printed position; and a device for remeasuring the printed position by sliding the scanner from left to right.

18. A position compensating apparatus as defined in claim 16, the third means including:

a first device for sliding the ink-jet print head from right to left to perform the printing operation at a given point when one-line transferring the print media; and a second device for sliding the scanner from right to left to scan a print point, thus measuring the printed position;

said second device sliding the scanner from right to left to remeasure the printed position.

19. An error-compensating method for scanned data, comprising:

a pattern-printing process with a moving ink-jet print head;

a bi-directional printed pattern-scanning process; and a data-yielding process for compensating for an error by detecting a position error of bi-directional scanning results;

wherein said bi-directional printed pattern-scanning process comprises sliding the ink-jet print head in a first direction and printing at a given point, sliding a scanner in said first direction to measure said given point of printing, and sliding said scanner in a second direction opposite to said first direction to further measure said given point of printing.

20. An error-compensating apparatus for scanned data, comprising:

means for printing a pattern with a moving ink jet print head;

means for bi-directional scanning of the printed pattern; and means for compensating for an error by detecting a position error based on bi-directional scanning results of the means for bi-directional scanning;

wherein said printing means slides the ink-jet print head in a first direction and prints at a given point; and wherein said bidirectional scanning means scans in said first direction to measure said given point of printing, and then scans in a second direction opposite to said first direction to further measure said given point of printing.

* * * * *